UNITED STATES PATENT OFFICE.

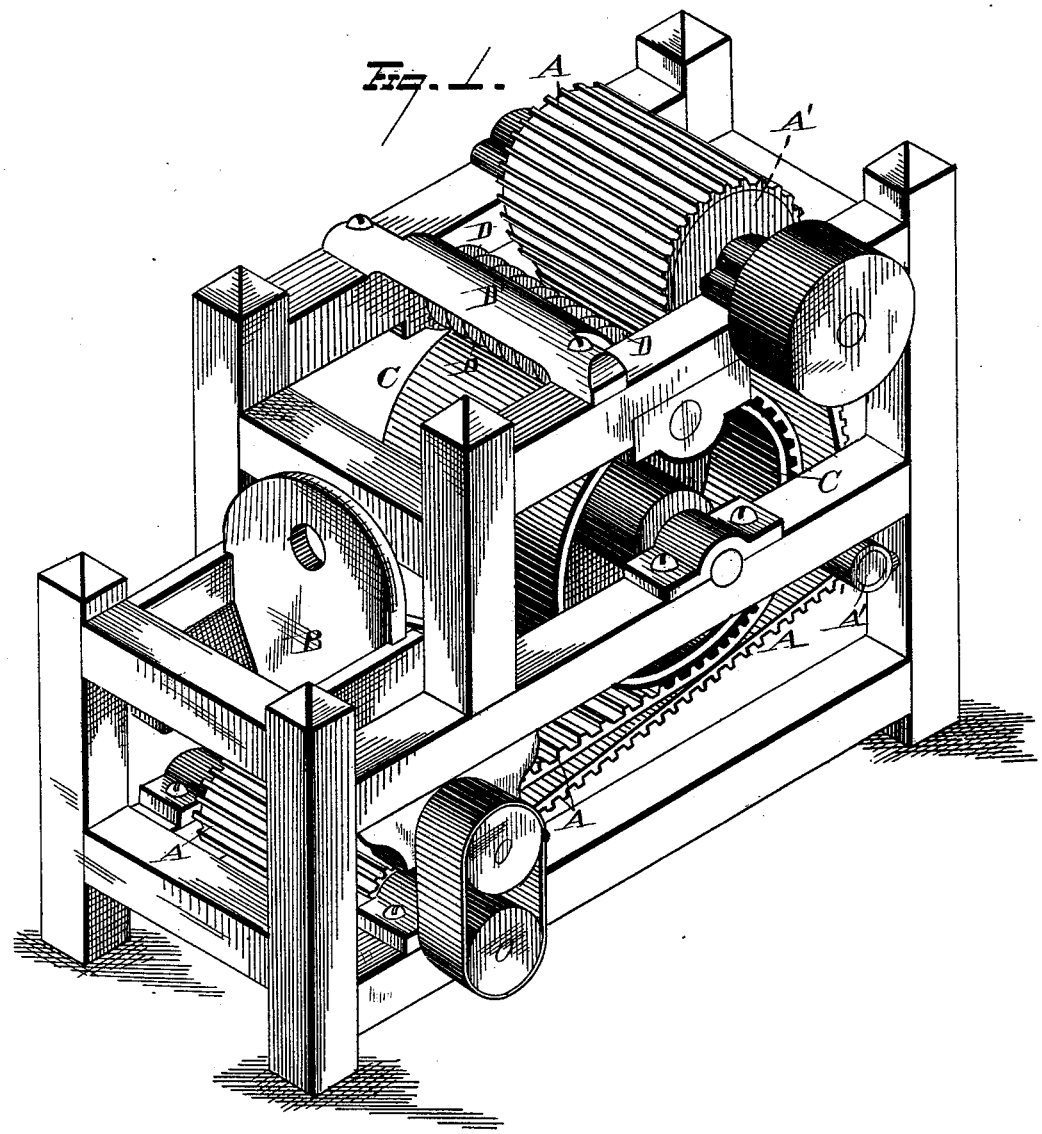

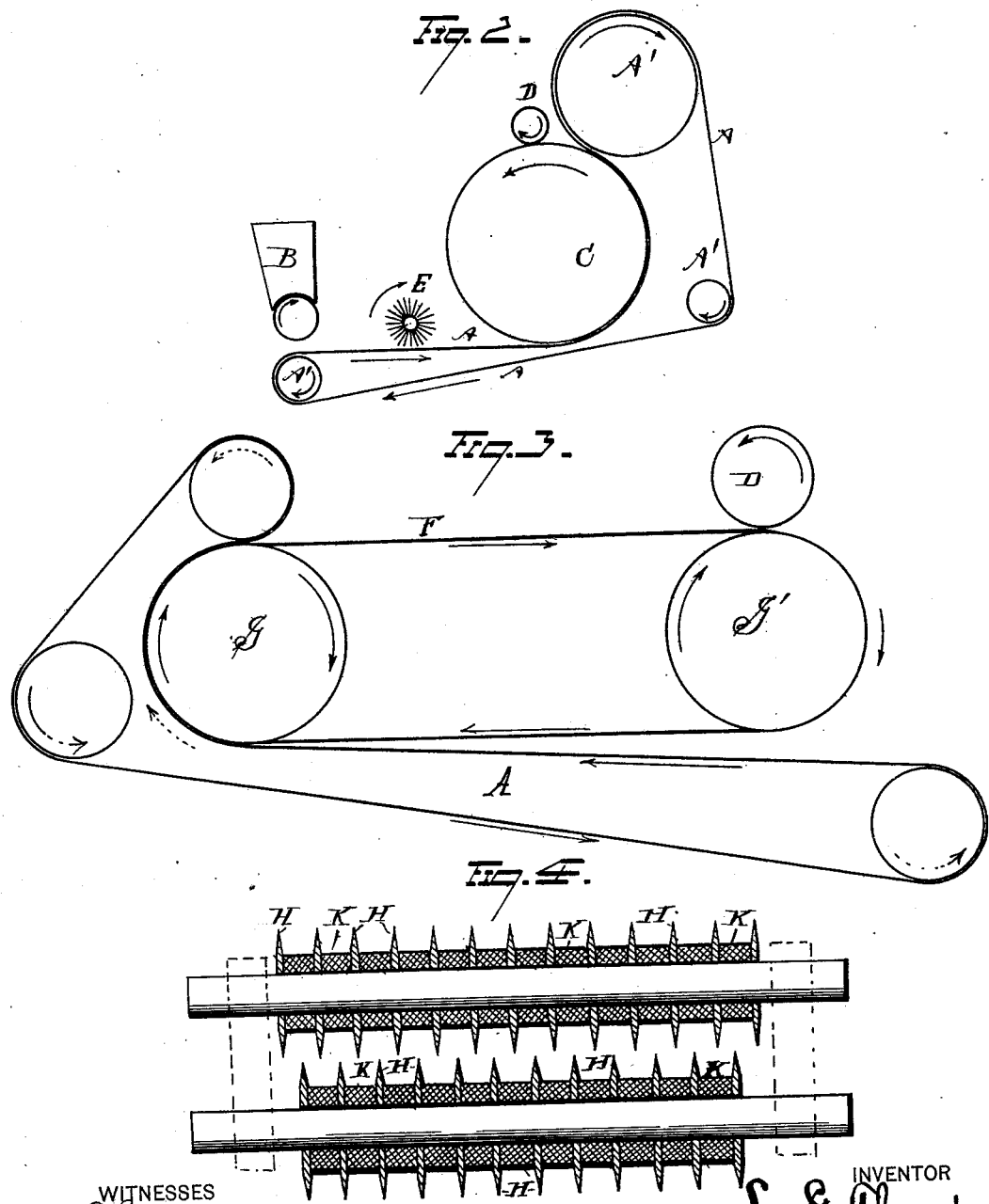

LUCIEN G. THORP, OF AKRON, OHIO, ASSIGNOR TO FERDINAND SCHUMACHER, OF SAME PLACE.

IMPROVEMENT IN OATMEAL-MACHINES.

Specification forming part of Letters Patent No. 222,548, dated December 9, 1879; application filed February 11, 1879.

*To all whom it may concern:*

Be it known that I, LUCIEN G. THORP, of Akron, in the county of Summit and State of Ohio, have invented certain new and useful Improvements in Machines for Cutting Grain; and I do hereby declare the following to be a full, clear, and exact description of the invention, such as will enable others skilled in the art to which it pertains to make and use it, reference being had to the accompanying drawings, which form part of this specification.

My invention relates to devices or machinery for cutting oat or other grains; and it consists in the parts and combination of parts hereinafter described and claimed.

In the drawings, Figure 1 is an isometric view of one form of device according to my invention. Fig. 2 is a diagrammatic illustration of the same device. Fig. 3 is a diagrammatic illustration of a modification of said device. Fig. 4 shows that part of the invention which pertains to the cutting-knives, the spaces between said knives being filled with rubber or any yielding or elastic substance, and extending sufficiently near to the periphery of the cutting-blades to afford an elastic bed for the grain while being divided.

A is an endless belt of any suitable construction or material, adapted to receive grain from any hopper, B, and so formed into transverse grooves or otherwise as that the grain in falling upon this belt shall arrange itself in any position relative to the cutting-blades that may be desired. This position I prefer to be transverse to the plane of said blades, or, in other words, parallel with the axis of the cutting-cylinder, although the carrying-belt A, if desired, might be so constructed as to present the grain in any diagonal relation to the knives, according to the peculiar construction of its carrying-surface; and in this respect I do not limit myself in any degree, as any desired angle whatever may be given to the carrying-grooves of the belt A. This belt is moved by any suitable arrangement whatever of rollers or pulleys A'.

Figs. 1 and 2 show two of a convenient variety of methods in which the pulleys A' and the belt A may be arranged and operated. Any arrangement will answer that will operate to receive the grains from any suitable feeding apparatus, and convey them properly to the cutting or dividing apparatus, and afterward discharge them.

C is a smooth surface, which I prefer to be a rotating cylinder; but the same may be made as a flat stationary surface, if so desired. Opposite to or facing the surface C is placed the cutting apparatus D, which may be of any description, although for general purposes I shall specify one convenient form of cutting or dividing apparatus which I have found to serve an acceptable purpose. The cutter D may either be operated by its frictional contact with the belt A, or it may be driven independently of said belt, as may be desired.

E is a brush, made revolving or otherwise, and adapted to operate upon the belt A in such a manner as to catch any grains not properly resting upon said belt, and to prevent their passage beneath said brush until they are properly arranged. For this purpose the brush should be made to operate in a direction to move the disarranged grain away from the cylinder C, as shown in Fig. 2.

The operation of the device shown in Fig. 1 is as follows: Grain placed in the hopper B is fed in any suitable manner to the belt A beneath it, upon which it falls. In falling upon this belt the grain, by resting in the grooves made upon the surface thereof, arranges itself accordingly, and if the grooves or resting-cavities upon the belt are formed transversely to the length, and the cutting-cylinder arranged with its axis also transversely to said belt, then the grains will be presented to the cutting-blades at right angles thereto, and will be divided squarely in two. As the grain after falling from the hopper is carried, as indicated by the arrows, toward the cylinder C, any that may not be properly resting upon the said belt will be caught by the brush E and prevented from passing beneath said brush until properly resting in the cups or cavities of said carrying-belt. The grain, after passing the brush E, is carried between the belt A and cylinder C to a point at or near the upper face of said cylinder C, when the belt discharges the grain upon said cylinder C, properly arranged, as before specified. After having been discharged, as above mentioned, the grain is carried on the surface of the cylinder C to the cutting device D, where it is divided. Such divided portions as are not freely discharged from the cutter D are eliminated by a stationary comb, D', or its equivalent. The divided grain is received and conveyed away in any desirable manner whatever, this feature forming no part of my invention.

In the form of device just specified, and shown in Fig. 1 of the drawings, the knife D is made to operate upon the grain after it is discharged from the belt upon the face of a revolving cylinder. The modified form shown in Fig. 3 of the drawings differs only in operation from the device before specified in that, instead of depositing the grain from the belt A to the face of a revolving cylinder, the grain is discharged upon the face of an endless belt, F, and carried by said belt beneath any suitable cutting device D; and this cutting device may face either a revolving cylinder or pulley, upon which the belt F is stretched, or a stationary surface, or both.

The modified form of device, as shown in Fig. 3, consists, essentially, of a suitable number and arrangement of pulleys, G G', for carrying the endless grain-belt A, already specified, in the manner and direction substantially as indicated in the drawings, the broken arrows showing the direction that the belt A travels, and the solid arrows the direction of the belt.

The belt F may, if desired, be of a character similar to the belt A; or it may have a plain surface.

In the modified device shown in Fig. 3, the grain is fed from the hopper to the belt A, then carried around the pulley G to its upper surface, where it is deposited from the belt A upon the belt F, and carried by the belt F to the cutting device D and discharged over the pulley G'.

Coming, now, to the description of one form of cutting device, and referring to Fig. 4 of the drawings, it will be seen that I arrange annular cutting-blades H in any suitable manner upon a common shaft or cylinder, and between said blades I place annular washers K. The washers K are made of rubber or any yielding or flexible material, and are formed with radial dimensions sufficient to extend nearly to the peripheries of the blades H. The elastic washers K are designed to act as retaining-cushions to prevent the grain from displacement while being divided, said grain being more or less embedded in the elastic washers. When two cutters D are used on the same machine I prefer arranging the blades K so that they shall be in quincunx relation the blades of one cutter with those of the other. This arrangement and form of device is shown in Fig. 4 of the drawings.

If desired, I may employ two cutters on the same machine, and in such case I locate the blades of one cutter in quincunx order with the blades of the other cutter.

In order to prevent the escape and loss of grain from the side of the belt A or F, any suitable device may be employed. One that would be as cheap and effective as any would be a belt having plain edges, with its intervening portion formed, as already specified, in such a manner as to receive and arrange the grain upon it. I also prefer making the cutting device D adjustable in such a manner as to regulate its pressure. This is desirable in the event of any foreign substance, such as a nail, passing between the cutter, in which event the cutter would yield and permit the nail to pass without injury.

What I claim is—

1. In a grain-cutting machine, the combination, with the endless apron, having grain-grooves formed thereon, of the surface made independent of said apron, and adapted to receive the grain discharged from the latter, together with the cutter, which operates upon the grain as it passes between the same and said surface, substantially as set forth.

2. In a grain-cutting machine, a cutter consisting in the combination, with a shaft provided with annular knives, of the embedding cushions, interposed respectively between said knives, substantially as set forth.

3. In a machine for cutting or dividing grain, an endless belt, A, having its face formed with cells, grooves, or depressions, in such a manner that grain falling or resting upon it shall rest in said grooves or depressions, substantially as and for the purpose shown.

4. The endless belt A, having its face formed as specified, for the purpose of receiving, holding, and arranging grain, in combination with one or more cutting or dividing devices, D, substantially as and for the purposes shown.

In testimony whereof I have signed my name to this specification in the presence of two subscribing witnesses.

LUCIEN G. THORP.

Witnesses:
JNO. CROWELL, Jr.,
W. E. DONNELLY.